United States Patent
Evans

(10) Patent No.: US 8,169,464 B2
(45) Date of Patent: May 1, 2012

(54) HARDWARE ARCHITECTURE FOR VIDEO CONFERENCING

(75) Inventor: Simon J. W. Evans, Ruscombe (GB)

(73) Assignee: Codian Ltd, The Courtyards (GB)

( * ) Notice: Subject to any disclaimer, the term of this patent is extended or adjusted under 35 U.S.C. 154(b) by 417 days.

(21) Appl. No.: 12/463,031

(22) Filed: May 8, 2009

(65) Prior Publication Data

US 2009/0213126 A1    Aug. 27, 2009

Related U.S. Application Data

(62) Division of application No. 11/942,512, filed on Nov. 19, 2007, now Pat. No. 7,889,226.

(30) Foreign Application Priority Data

| Nov. 20, 2006 | (GB) | ................................ 0623096.5 |
| Nov. 20, 2006 | (GB) | ................................ 0623097.3 |
| Nov. 20, 2006 | (GB) | ................................ 0623098.1 |
| Nov. 20, 2006 | (GB) | ................................ 0623100.5 |

(51) Int. Cl.
   *H04N 7/14*   (2006.01)
(52) U.S. Cl. ................ 348/14.09; 348/14.08; 348/14.12
(58) Field of Classification Search .... 348/14.01–14.16; 709/204–205; 370/260–261
   See application file for complete search history.

(56) References Cited

U.S. PATENT DOCUMENTS

| 4,650,929 | A | 3/1987 | Boerger et al. |
| 4,882,747 | A | 11/1989 | Williams |
| 5,175,824 | A | 12/1992 | Soderbery et al. |
| 5,201,038 | A | 4/1993 | Fielder |
| 5,440,563 | A | * | 8/1995 | Isidoro et al. .................. 370/270 |
| 5,473,367 | A | | 12/1995 | Bales et al. |
| 5,483,588 | A | | 1/1996 | Eaton et al. |
| 5,495,522 | A | | 2/1996 | Allen et al. |
| 5,600,646 | A | | 2/1997 | Polomski |

(Continued)

FOREIGN PATENT DOCUMENTS

EP    2 045 983 A2    4/2009

(Continued)

OTHER PUBLICATIONS

Addeo, E.J. et al. (Mar. 17, 1987). "A Multi-media Multi-point Communication Services Capability for Broadband Networks," *International Switching Symposium 1987 Proceedings*, Phoenix, AZ, Mar. 15-20, 1987, 2:. C5.5.1-05.5.6.

(Continued)

*Primary Examiner* — Melur Ramakrishnaiah
(74) *Attorney, Agent, or Firm* — Oblon, Spivak, McClelland, Maier & Neustadt, L.L.P.

(57) ABSTRACT

Video processing architectures, systems, and methods for a multipoint control unit are provided. In one example, a video processing system includes a motherboard and at least one daughterboard, each daughterboard having a plurality of processors interconnected via a daughterboard switch, where the daughterboard switch is configured to switch data between the plurality of processors and between the motherboard and daughterboard. The video processing system may further include a plurality of daughterboards each having an identical hardware and/or mechanical configuration. The plurality of daughterboards may be configured to be mechanically and electrically couplable together in any order, and may be stackable to form a series chain of daughterboards extending from the motherboard, each respective daughterboard switch being further configured to switch data to a daughterboard switch on another daughterboard to permit data flow along said series chain.

4 Claims, 5 Drawing Sheets

U.S. PATENT DOCUMENTS

| | | | |
|---|---|---|---|
| 5,640,195 | A | 6/1997 | Chida |
| 5,771,273 | A | 6/1998 | McAllister et al. |
| 5,821,985 | A | 10/1998 | Iizawa |
| 5,841,763 | A | 11/1998 | Leondires et al. |
| 5,867,653 | A | 2/1999 | Aras et al. |
| 5,872,922 | A | 2/1999 | Hogan et al. |
| 5,929,898 | A | 7/1999 | Tanoi |
| 5,982,459 | A | 11/1999 | Fandrianto et al. |
| 5,999,981 | A | 12/1999 | Willenz et al. |
| 6,025,870 | A | 2/2000 | Hardy |
| 6,128,649 | A | 10/2000 | Smith et al. |
| 6,215,515 | B1 | 4/2001 | Voois et al. |
| 6,366,771 | B1 | 4/2002 | Angle et al. |
| 6,370,113 | B1 | 4/2002 | Paradiso et al. |
| 6,442,758 | B1 * | 8/2002 | Jang et al. .............. 725/119 |
| 6,445,472 | B1 | 9/2002 | Kim et al. |
| 6,496,216 | B2 | 12/2002 | Feder et al. |
| 6,574,469 | B1 | 6/2003 | Xiang et al. |
| 6,577,712 | B2 | 6/2003 | Larsson et al. |
| 6,584,076 | B1 | 6/2003 | Aravamudan et al. |
| 6,584,077 | B1 | 6/2003 | Polomski |
| 6,590,604 | B1 | 7/2003 | Tucker et al. |
| 6,614,465 | B2 | 9/2003 | Alexander et al. |
| 6,614,845 | B1 | 9/2003 | Azadegan |
| 6,633,324 | B2 | 10/2003 | Stephens, Jr. |
| 6,697,476 | B1 | 2/2004 | O'Malley et al. |
| 6,750,896 | B2 | 6/2004 | McClure |
| 6,757,005 | B1 | 6/2004 | Elbaz et al. |
| 6,760,749 | B1 | 7/2004 | Dunlap et al. |
| 6,760,776 | B1 | 7/2004 | Gallo et al. |
| 6,771,779 | B1 | 8/2004 | Eriksson et al. |
| 6,810,035 | B1 | 10/2004 | Knuutila et al. |
| 6,883,084 | B1 | 4/2005 | Donohoe |
| 6,963,353 | B1 | 11/2005 | Firestone |
| 6,989,856 | B2 | 1/2006 | Firestone et al. |
| 7,113,200 | B2 | 9/2006 | Eshkoli |
| 7,136,475 | B1 | 11/2006 | Rogers et al. |
| 7,366,780 | B2 * | 4/2008 | Keller et al. ............ 709/227 |
| 2002/0044201 | A1 | 4/2002 | Alexander et al. |
| 2002/0064149 | A1 | 5/2002 | Elliott et al. |
| 2004/0012600 | A1 | 1/2004 | Deering et al. |
| 2004/0015633 | A1 | 1/2004 | Smith |
| 2004/0207724 | A1 | 10/2004 | Crouch et al. |
| 2005/0044503 | A1 * | 2/2005 | Richardson et al. ...... 715/753 |
| 2005/0108328 | A1 | 5/2005 | Berkeland et al. |
| 2005/0248652 | A1 | 11/2005 | Firestone et al. |
| 2006/0026002 | A1 | 2/2006 | Potekhin et al. |
| 2006/0077252 | A1 | 4/2006 | Bain et al. |
| 2006/0164507 | A1 | 7/2006 | Eshkoli et al. |
| 2006/0164508 | A1 | 7/2006 | Eshkoli et al. |
| 2006/0237835 | A1 | 10/2006 | Fujita et al. |
| 2006/0245379 | A1 | 11/2006 | Abuan et al. |

FOREIGN PATENT DOCUMENTS

| | | |
|---|---|---|
| GB | 2 397 964 | 8/2004 |
| WO | WO93/14459 | 7/1993 |
| WO | WO-96/08911 A1 | 3/1996 |
| WO | WO 96/23388 A1 | 8/1996 |
| WO | WO-03/063484 A1 | 7/2003 |
| WO | WO2005/112424 | 11/2005 |

OTHER PUBLICATIONS

Bernard, J.D. (Jul. 14, 1999). "Streaming Services Manual: Installation and Operation," PictureTel Streaming Manual V1.0.8, 156 pages.

Boyer, D.C. et al. (Oct. 1994). "The Personal Presence System A Wide Area Network Resource for the Real Time Composition of Multipoint Multimedia Communications,"*ACM Multimedia '94 Proceedings*, San Francisco, CA, Oct. 15-20, 1994, pp. 453-460.

Compression Labs, Incorporated. (1993-1996). "Multipoint2: Multimedia Conference Server, Release 5.1 Administration Guide," 394 pages.

Gong, F. (1994). "Multipoint Audio and Video Control for Packet-based Multimedia Conferencing," *ACM Multimedia '94 Proceedings*, San Francisco, CA, Oct. 15-20, 1994, pp. 425-432.

Holfelder, W. (Oct. 1998). "Interactive Remote Recording and Playback of Multicast Videoconferences," *Computer Communications* 21(15): 1285-1294.

Horn, D.N, et al. (Jan./Feb. 1993). "A Standards-based Multimedia Conferencing Bridge," *AT&T Technical Journal* 72(1):41-49.

Integrated Device Technology, Inc. (Feb. 13, 2006). "Serial RapidIOTM PreProcessing Switch for DSP Clusters," 70K2000 Product Brief, 2 pages.

International Telecommunication Union. (Feb. 1998). "H.323: Packet-based Multimedia Communications Systems," 127 pages.

International Telecommunication Union. (Nov. 2000). "H.323 Annex M. 1: Tunnelling of Signalling Protocols (QSIG) in H.323," 5 pages.

International Telecommunication Union. (Jul. 2001). "H.323 Annex M3: Tunnelling of DSSI Through H.323," 10 pages.

International Telecommunication Union. (Jul. 2001). "H.323 Annex Q: Far-end Camera Control and H,281/H.224," 9 pages.

Johnson, J.T. (Aug. 1992). "Mix-and-Match Videoconferencing," *Data Communications*, pp. 73-74.

Lukacs, M.E. (Oct. 1994). The Personal Presence System Hardware Architecture,' *ACM Multimedia '94 Proceedings*, San Francisco, CA, Oct. 15-20, 1994, pp. 69-76.

Microsoft Corporation. (Date Unknown). "NMR_901," located at <http://www.microsoft.com/windows/NetMeeting/Corp/rerskitlimages/NMR_901 .01 F>, last visited Mar. 19, 2006, 1 page.

Microsoft Corporation. (Last updated Dec. 10, 1999). "Chapter 1: Installation Requirements and Setup," located at <http://www.microsoft.com/windows/NetMeeting/Corp/reskit/Chapter1 /default.asp>, last visited Mar. 22, 2006, 8 pages.

Microsoft Corporation. (Last updated Dec. 10, 1999). "Chapter 2: Resource Kit Wizard," located at <http://www. microsoft.com/windows/NetMeeting/Corp/reskit/Chapter2/default.asp>, last visited Mar. 22, 2006, 15 pages.

Microsoft Corporation. (Last updated Dec. 10, 1999). "Chapter 4: Firewall Configuration," located at <http://www.microsoft.com/windows/NetMeeting/Corp/reskitlChapter4/default.asp>, last visited Mar. 22, 2006, 6 pages.

Microsoft Corporation. (Last updated Dec. 10, 1999). "Chapter 7: Network Bandwidth Considerations," located at <http://www.microsoft.com/windows/NetMeeting/Corp/reskit/Chapter7/defaultasp>, last visited Mar. 22, 2006, 43 pages.

Microsoft Corporation. (Last updated Dec. 10, 1999). "Chapter 8: NetMeeting Architecture," located at <http://www.microsoft.com/windows/NetMeeting/Corp/reskitlChapter8/default. asp>, last visited Mar. 22, 2006, 4 pages.

Microsoft Corporation. (Last updated Dec. 10, 1999). "Chapter 9: Product Interoperability," located at <http://www. microsoft.com/windows/NetMeeting/Corp/reskit/Chapter9/default.asp>, last visited Mar. 22, 2006, 4 pages.

Microsoft Corporation. (Last updated Dec. 10, 1999). "Chapter 10: Understanding the T.120 Standard," located at <http://www.microsoft. com/windows/NetMeeting/Corp/reskitlChapter1 0/default. asp>, last visited Mar. 22, 2006, 9 pages.

Microsoft Corporation. (Last updated Dec. 10, 1999). "Chapter 11: Understanding the H.323 Standard," located at <http://www.microsoft.com/windows/NetMeeting/Corp/reskitlChapter1 1 /default.asp#mcu>, last visited Mar. 19, 2006, 11 pages.

Microsoft Corporation. (Last updated Dec. 15, 1999). "Chapter 3: Finding People," located at <http://www. microsoft. com/windows/NetMeeting/Corp/reskiVChapter3/default.asp>, last visited Mar. 22, 2006, 7 pages.

Microsoft Corporation. (Last updated Dec. 15, 1999). "Chapter 5: NetMeeting Security," located at <http://www.microsoft.com/windows/NetMeeting/Corp/reskitlChapter5/default.asp>, last visited Mar. 22, 2006, 13 pages.

Microsoft Corporation. (Last updated Dec. 15, 1999). "Chapter 12: Conferencing Standards," located at <http://www. microsoft.com/windows/NetMeeting/Corp/reskitlChapter1 2/default.asp>, last visited Mar. 22, 2006, 4 pages.

Microsoft Corporation. (Last updated Jan. 3, 2000). Chapter 6: Using NetMeeting on Intranet Web Pages, located at <http://www.microsoft.com/windows/NetMeeting/Corp/reskit/Chapter6/default. asp>, last visited Mar. 22, 2006, 11 pages.

Niblett, P.D. etal. (Oct. 1, 1994). Control of Video Telephony From a DataConferencing System, *IBM Technical Disclosure Bulletin* 37(10):327-332.

Parnes, P. et al. (Jun. 1997). "mTunnel: A Multicast Tunneling System With a User Based Quality-of-Service Model," *Interactive Distributed Multimedia Systems and Telecommunication Services*, pp. 53-62.

Toga, J. (2000). "Introduction to H.323,"PowerPoint Presentation,10 pages.

VCON Ltd. (2001). "VCON Conferencing Systems, MeetingPoint®Version 4.6 User's Guide," 213 pages.

White Pine Software, Inc. (Date Unknown). "MeetingPoint" Conference Server, 19 pages.

Willebeek-Lemair, M.H. et al. (Oct. 1994). "On Multipoint Control Units for Videoconferencing," *19 Conference on Local Computer Networks Proceedings*, Minneapolis, MN, Oct. 2-5, 1994, pp. 356-364.

\* cited by examiner

HARDWARE ARCHITECTURE FOR VIDEO CONFERENCING

CROSS REFERENCE TO RELATED APPLICATION

The present divisional application claims the benefit of priority under 35 U.S.C. §120 to U.S. application Ser. No. 11/942,512, filed on Nov. 19, 2007, which is incorporated herein by reference for all purposes. The present application is related to and claims benefit to GB patent application nos. 0623096.5, 0623097.3, 0623098.1, and 0623100.5, all of which are entitled "Hardware Architecture for Video Conferencing," and were filed Nov. 20, 2006, and all of which are incorporated herein by reference for all purposes.

BACKGROUND

1. Field

The present invention relates generally to hardware architectures and associated methods for a multipoint control unit.

2. Related Art

Video conferencing and the associated hardware, falls broadly into two camps. In the first camp, "conferencing" occurs between only two participants and the participants are connected directly to one another through some form of data network. In this form of network, only two endpoints are involved and true conferencing only occurs if multiple participants are present at one of the two endpoint sites. Examples of this type of conferencing are, at the low technology end, PC enabled endpoints interconnecting using software such as NetMeeting® or Skype® and at the higher end equipment using dedicated endpoint hardware interconnected, for example, via ISDN links.

In the second camp, video conferencing allows more than two endpoints to interact with one another. This is achieved by providing at least one centralized coordinating point; a so-called "multipoint control unit (MCU)", which receives video and audio streams from the endpoints, combines these in a desired way and re-transmits the combined composite video/audio stream to the participants. Typically the conference view transmitted to the endpoints is the same for each endpoint. The composition may change over time but is the same for all the participants.

The provision of only a single composition is a significant problem because each participant must therefore receive a conference stream tailored so that it is acceptable to the least capable endpoint in the conference. In this situation therefore many endpoints are not used to their full capacity and may experience degraded images and audio as a result.

More recently, modem MCUs such as the Codian MCU 4200® series have been designed to allow a unique view to be created for each participant. This allows the full capabilities of each endpoint to be utilized and also allows different compositions for different participants so that, for example, the emphasis of a particular participant in the conference may be different for a different user. However, the processing of video data in real time is a highly processor intensive task. It also involves the movement of large quantities of data. This is particularly so once the data has been decompressed in order to perform high quality processing. Thus processing power and bandwidth constraints are a significant bottleneck in the creation of high quality video conferencing MCt's which allow multiple views of the conference to be produced.

FIG. 1 shows a typical prior art MCU architecture. The exemplary architecture has a plurality of digital signal processors 2 such as the Texas Instruments TMS series, which are interconnected via a Time Division Multiplexed (TDM) bus 4. A controller and network interface 6 is also connected to the TDM bus. Each DSP 2 is allocated one or more timeslots on the TDM bus. It will be appreciated that the TDM bus is a significant bottleneck. Whilst increased processing power for the MCU may be achieved by adding more powerful DSPs or additional DSPs, all the data flowing between DSPs and between the network 8 and the DSPs must fit into a finite number of time slots on the TDM bus 4. Thus, this form of architecture generally scales poorly and cannot accommodate the processing requirements of per-participant compositions.

FIG. 2 shows an alternative prior art configuration. In this example, a plurality of DSPs 2-1 are each connected to a Peripheral Component Interconnect (PCI) bus 10-1. Similarly, a plurality of DSPs 2-2, 2-3 and 2-4 are connected to respective PCI buses 10-2, 10-3 and 10-4. The PCI buses 10-2, 10-3 and 10-4 are in turn connected via buffers 12 to a further PCI bus 14. A significant advantage of this architecture over that shown in FIG. 1 is that the DSPs in group 2-1 may communicate amongst one another with the only bottleneck being the PCI bus 10-1. This is true also for the groups 2-2, 2-3 and 2-4. However, should a DSP in group 2-1 wish to communicate with a DSP for example, in group 2-3, the PCI bus 14 must be utilized. Thus although this architecture is a significant improvement on that shown in FIG. 1 in terms of scalability and the ability to effectively use a plurality of DSPs, the PCI bus 14 must still be used for certain combinations of intra-DSP communication and thus may become a performance limiting factor for the MCU architecture.

Attempts have been made to offload processing from DSPs. For example, IDT produces a "Pre-processing switch (PPS)," under part number IDT 70K2000, for use with DSPs. The PPS carries out predetermined functions before delivery to a processor such as a DSP or FPGA. Processing is determined based on the address range on the switch to which packets are sent. The chip is designed, e.g., for use in 3G mobile telephony and is designed, e.g., to offload basic tasks from DSPs which would normally be carried out inefficiently by the DSP. U.S. Pat. No. 6,883,084 also proposes the use of path processing; however, in that case it is proposed as an alternative to a Von Neumann type sequential processor.

BRIEF SUMMARY

According to one aspect of the present invention, a video processing architecture and system for a multipoint control unit are provided. In one example, the video processing system includes a motherboard and at least one daughterboard, each daughterboard having a plurality of processors interconnected via a daughterboard switch, where the daughterboard switch is configured to switch data between the plurality of processors and between the motherboard and daughterboard. In one example, the processors include digital signal processors (DSPs).

The video processing system may further include a plurality of daughterboards each having an identical hardware and/or mechanical configuration. The plurality of daughterboards may be configured to be mechanically and electrically couplable together in any order, and may be stackable to form a series chain of daughterboards extending from the motherboard, each respective daughterboard switch being further configured to switch data to a daughterboard switch on another daughterboard to permit data flow along said series chain. The motherboard may further include a motherboard switch arranged to switch data between a plurality of daughterboards. The motherboard switch and/or the daughterboard switch may include at least part of a field programmable gate array.

According to another aspect of the present invention a method for processing video in a multipoint control unit is provided. The multipoint control unit may include a motherboard and at least one daughterboard, each of the at least one daughterboard having a plurality of processors interconnected via a daughterboard switch, the method including switching data between the plurality of processors associated with the daughterboard and between the motherboard and daughterboard. The method may further comprise switching data to a daughterboard switch on another daughterboard to permit data flow along a series chain of stackable daughterboards extending from the motherboard.

According to another aspect of the present invention, a video processing system for a multipoint control unit includes a plurality of processors adapted to perform processing of data representative of video images, a plurality of links (e.g., physical links between processors, a switch fabric, or the like) interconnecting the plurality of processors, and a stream processor (e.g., a processor or processing unit) configured to process data as it passes between the plurality of processors over the links.

The stream processor may be formed as part of a field programmable gate array. Further, the stream processor may be associated with a memory co-located on the field programmable gate array or external to the field programmable gate array. The stream processor may include predetermined logic and is at least partially programmable in operation by loading one or both of bit masks and data into said memory.

The stream processor may further be operable to perform bandwidth compression and/or de-compression on a video stream passing through the processor. Further, the stream processor may be associated with a memory operable to store historical information about previous portions of the video stream which have passed through the processor.

According to another aspect of the present invention, a method for transmitting a scaled video image to different destinations at different respective scaling levels is provided. In one example, the method is carried out via an MCU having a plurality of processors operable to perform processing of data representative of video images, the plurality of processors interconnected by a plurality of links, and a plurality of stream processors operable to process data as it passes between the processors over the plurality of links. The method includes performing video scaling of video data in a first of the stream processors to a first scale level required by a first destination and performing subsequent scaling of the video data using a second stream processor to a second, smaller scaling level for a second destination. The method may further include storing a network map holding data representative of a network topology of the architecture and making scaling decisions with reference to the map.

According to another aspect of the present invention, a video processing system for a multipoint control unit includes a plurality of processors adapted to perform processing of data representative of video images, the plurality of processors being interconnected via switches operable to choose between unicast and multicast onward transmission of received data.

The video processing system may further include a topology store which contains data representative of the links between the processors and wherein the switches access the topology store to make routing decisions and also to make the choice between unicast or multicast onward transmission of data. In another example, the video processing system may include a topology store which contains data representative of the links between the processors and a controller operable to attach routing information to data related to a desired route across the links before the data is transmitted.

According to another aspect of the present invention a method for routing video data in a multipoint control unit having a plurality of signal processors is provided. The method includes storing or retrieving a network map holding data representative of a network topology which interconnects the signal processors, and selectively switching one or more of a plurality of switches to switch data between the signal processors in unicast or multicast mode dependent on the network map. The method may further include transmitting information in unicast mode until a routing branch is reached at which data needs to follow a plurality of links and then transmitting information in multicast mode at that routing branch.

Additionally, computer readable medium encoded with computer program instructions for operating and routing video data in a multipoint control unit having a plurality of signal processors is provided here. The computer program instructions may comprise instructions for carrying out one or more of the methods described herein.

Other aspects and features of the present invention will become apparent to those ordinarily skilled in the art upon review of the following description of specific embodiments of the invention in conjunction with the accompanying figures.

DETAILED DESCRIPTION

The following description is presented to enable a person of ordinary skill in the art to make and use the various aspects and examples of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
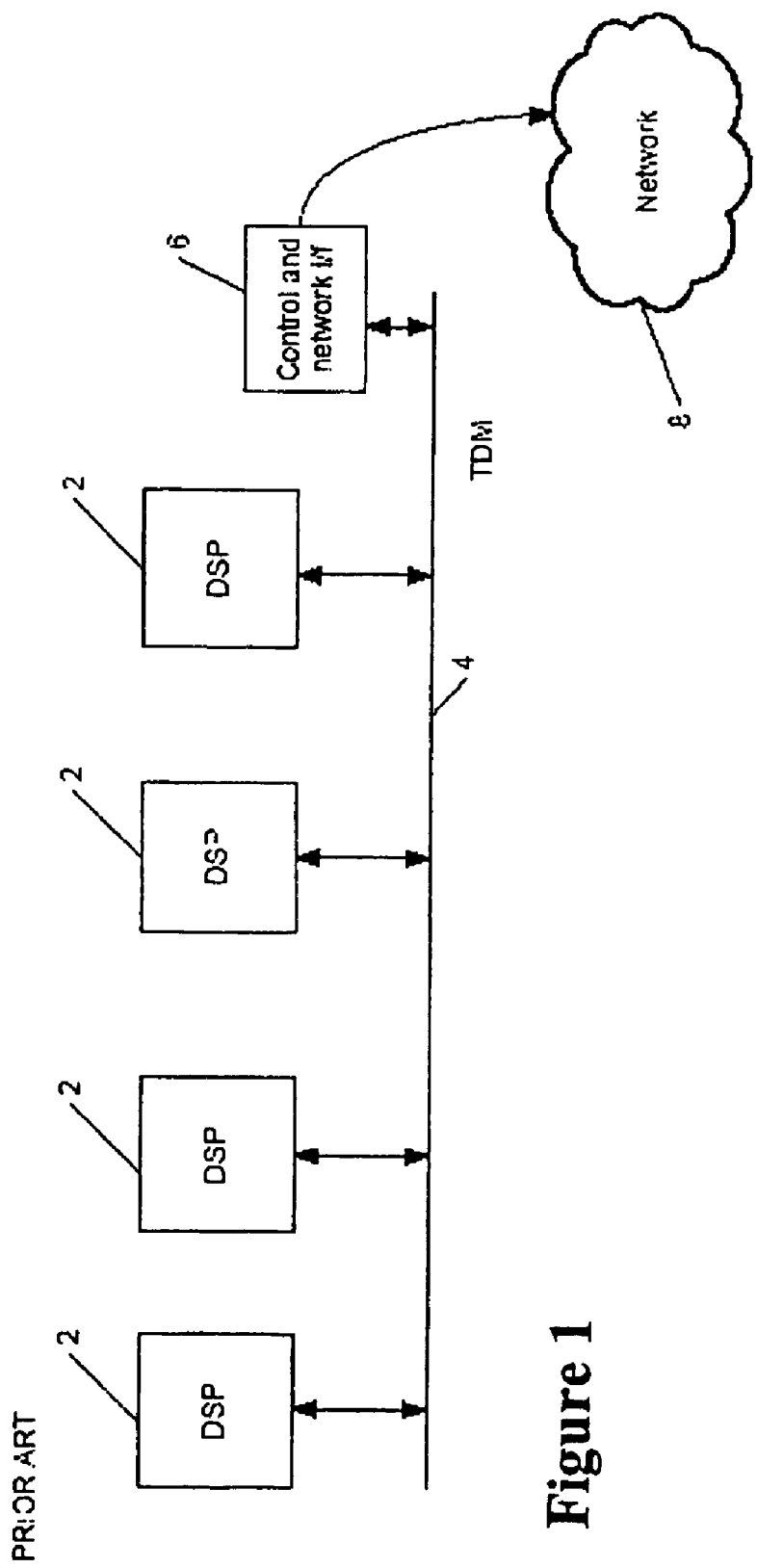
FIG. 1 is a schematic block diagram of a prior art MCU architecture.
Figure 2:
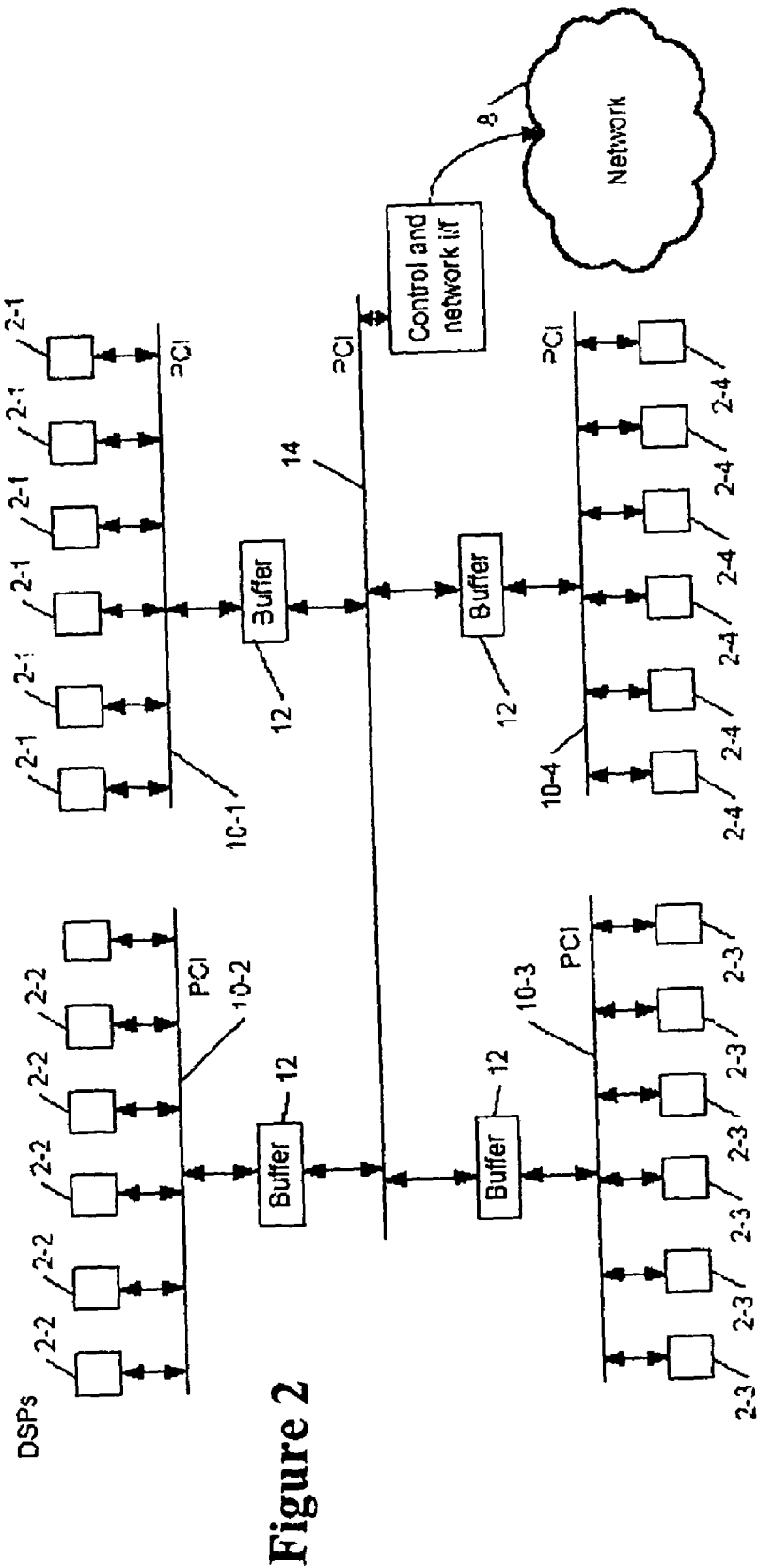
FIG. 2 is schematic block diagram of an alternative prior art MCU architecture.
Figure 3:
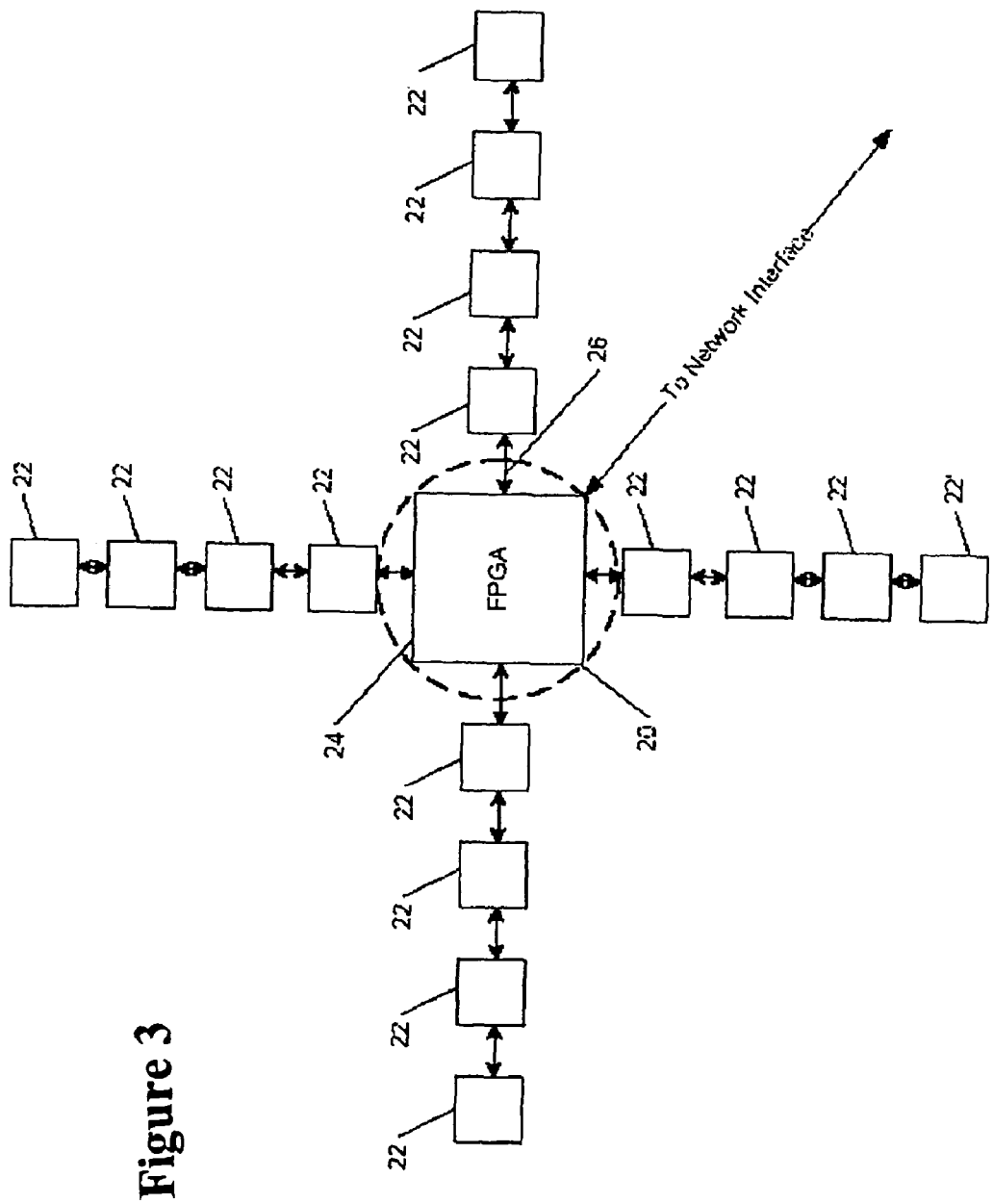
FIG. 3 is a schematic block diagram showing a motherboard and a plurality of daughterboards in accordance with one example of the present invention.

With reference to FIG. 3, a motherboard 20 carries a field programmable gate array (FPGA) and other associated components. The motherboard 20 may include control circuitry which, for example, enables an auto attendant interface to be produced to allow users to configure the MCU and which may also control data flow in the MCU. These components may alternatively be on a separate board as is known in the art.

The motherboard 20 also includes connectors which permit the mounting of one or more daughterboards 22. In one example, four daughterboards may be connected to the motherboard 20. The connection may, for example, be made using pluggable connectors. By using a plurality of such connectors, in the preferred embodiment the daughterboards are both electrically coupled and mechanically mounted to the motherboard by such connectors.

The motherboard 20 carries an FPGA 24 which carries out routing functions (among other functions). Primarily, the FPGA 24 routes data between the controller (not shown), network interface (not shown) and the plurality of daughterboards 22. In one example, FPGA 24 has four high bandwidth links 26 which may have a bandwidth, for example, of 3 Gb/sec or higher, and which connect the motherboard 20 with a first layer of daughterboards. It is noted that links 26 (and 38 below) may include physical links, a switch fabric, or other suitable structures or system for connecting motherboards, daughterboards, and DSPs. Data flows to the distal daughterboards are routed through the first layer of daughterboards as explained in more detail below.

Figure 4:
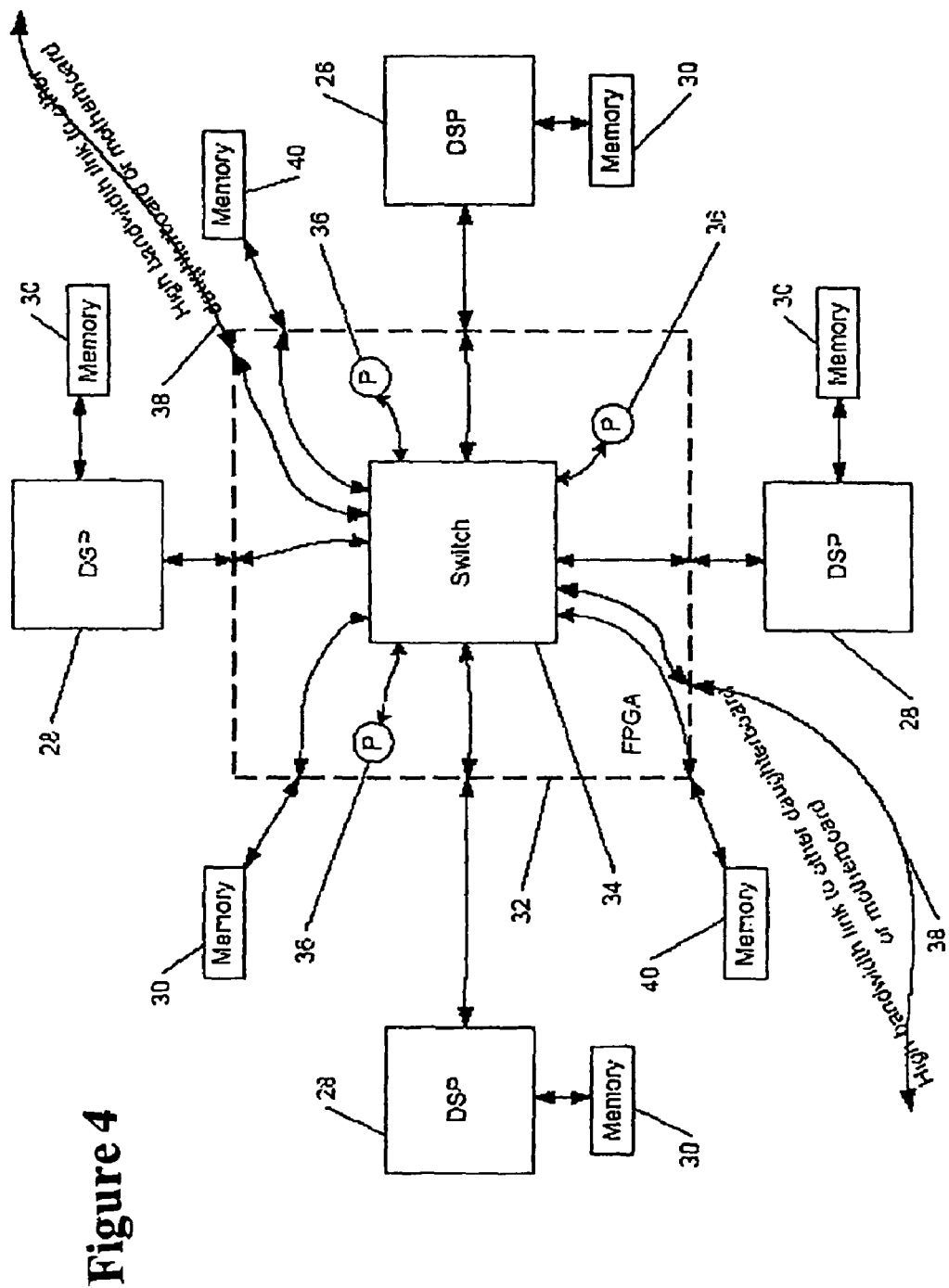
FIG. 4 is a schematic block diagram of a daughterboard in accordance with one example of the invention.

In one example, and with reference also to FIG. 4, each daughterboard 20 has four DSPs 28 each with associated memory 30. Each daughterboard also has an FPGA 32 which incorporates a switch 34. Switch 34 may include structure or logic for receiving packets on an input and sending the packets out in a selectable manner, e.g., similar to a network switch. The FPGA 32 includes stream processors 36 (e.g., a processor or processing unit configured to process data as it passes between the plurality of processors over the links) which are described in more detail below, and two high bandwidth links 38.

In one example, daughterboards 22 are each mechanical and electrical identical and links 38 may be used to connect to another daughterboard or to motherboard 20. In this way, extra processing capability may be added to the architecture simply by adding additional daughterboards. In a minimal configuration, a single daughterboard may be mounted on the motherboard. In a maximal configuration, in this example, four daughterboards may be mounted to the motherboard and each daughterboard may have additional daughterboards (three in this example) stacked thereon. As explained above, each daughterboard itself may include four DSPs and thus in this particular example, a configuration including four daughterboards, the architecture may have 64 DSPs. Of course, various numbers of DSPs and/or daughterboards may be used and the maximal configuration is with reference only to this particular example of 16 daughterboards, each including four DSPs.

Several strategies may be used to alleviate bandwidth congestion on the links or interconnects between the DSPs. In one illustrative example, each link or interconnect between daughterboards operates at a bandwidth of 3 Gb/sec or higher which is a substantially higher bandwidth than in the prior art. Additionally, the daughterboards may each have four DSPs sharing a local interconnect which may communicate amongst one another without using bandwidth on any other interconnect in the architecture. Thus, with appropriate resource allocation, the DSPs on any one daughterboard may experience high utilization without significant bandwidth impact for the architecture as a whole. Furthermore, data may flow between DSPs in any one of the four branches shown in FIG. 3, without using bandwidth available to the other branches.

In another aspect and example, each of the daughterboards 22 includes a stream processor 36 located in each of the daughterboard FPGAs 32. Stream processors 36 are configured to take advantage of an unusual characteristic of video conferencing as explained below and may include any suitable processor or processing unit configured to process data as it passes between the plurality of processors over the links.

Typically, data flowing between endpoints in a video conference is highly compressed in view of bandwidth constraints, for example, with Internet connected endpoints. However, this compression typically prevents manipulation of the images. Thus, within an MCU, video processing is carried out on uncompressed data. Typically, this increases the volume of data by a factor between 10 and 100 and typically by a factor of about 80. Thus a typical video stream may have a bandwidth requirement of 50 Mb/sec, for example. This is a significant problem peculiar to video conferencing since processing is carried out on many simultaneous streams and is carried out in real time. However, since the end result of the processing will be transmitted in compressed form, and also typically over a lossy network, it is acceptable to carry out compression within the MCU. Such compression may be lossless or given the nature of the output network, lossy. Accordingly, in one example provided herein, conventional bandwidth constraints within the MCU may be alleviated by performing compression and decompression within the MCU for data in transit between DSPs. However, this in itself is computationally expensive. Accordingly, in one example provided herein, an exemplary system includes stream processors 36, which may include any form of processing unit, formed in each daughterboard FPGA 32. The media stream processors 36 may act on several pixels when performing compression and thus the FPGA may keep a frame or a portion of a video frame in an associated memory 40 such that the stream processors 36 in this mode are not strictly stream processors. Further stream processors 36 may include any suitable processors or processing units configured to process data as it passes between the plurality of processors over the links.

The processors 36 may carry out further operations including, but not limited to composition, alpha blending, motion compensation, variable length encoding and decoding, frame comparison, combinations thereof, and the like. By carrying out these steps on the fly as data is passed between DSPs 28, processing load is removed from the DSPs and also bandwidth limitations are mitigated.

In another example, data destined for several different DSPs may be sent in unicast format until a routing branch is required in which case some data may be sent in multicast form. This avoids having multiple streams of the same data passing along the same link. For example, if daughterboard 22 at the far left of FIG. 3 wishes to communicate with a DSP on the daughterboard 22' at the bottom of the figure and also with the daughterboard 22" at the far right of the figure, the data may be unicast until it reaches the motherboard 20 at which point it may be multicast to each of the two respective branches of daughterboards radiating out from the motherboard and then unicast along each of the branches. This step may be carried out within the FPGA 24 as part of its routing algorithm. To facilitate this, each switch may maintain a representation of the topology of the entire MCU architecture, for example in tree form, and is operable to manipulate the tree and to determine an appropriate multicast or unicast format for the next hop or hops. Alternatively, the route may be determined at the data source and routing information carried with the data which is interpreted by the switches enroute.

The media stream processors 36 may also use factorized scaling to assist with reducing the bandwidth of communications between DSPs. For example, if different participant compositions require differently scaled versions of the same image such as an image scaled to a half for one participant and a quarter for another participant, the FPGAs may be configured to make sensible scaling decisions. In this example the FPGA may scale the whole image to a half, transmit the thereby reduced data as far as the routing branch which chooses between the DSP which will process the half and the DSP which will process the quarter image and at that point further scale the image down to a quarter for onward transmission to the DSP dealing with the quarter scaled image.

The intelligent routing, multicast and scaling/compression operations are carried out by each daughterboard FPGA and accordingly the processing load for these intelligent routing decisions is distributed amongst each of the daughterboards.

In this way, therefore, the architecture described above may increase or maximize the utilization of the DSPs by ensuring that data is ideally allocated to local DSPs and also where data must be transmitted between more distant DSPs, that the data is transmitted in an efficient format. Furthermore, by employing very high bandwidth links between the DSPs, bandwidth bottlenecks are largely avoided. Accordingly, the architecture provides a highly scalable and very powerful processing platform for high definition per participant composed multi-conference video conferencing.

Of course, other features and advantages will be apparent to those skilled in the art. The foregoing system overview represents some exemplary implementations, but other implementations will be apparent to those skilled in the art, and all such alternatives are deemed equivalent and within the spirit and scope of the present invention, only as limited by the claims.

Those skilled in the art will further recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
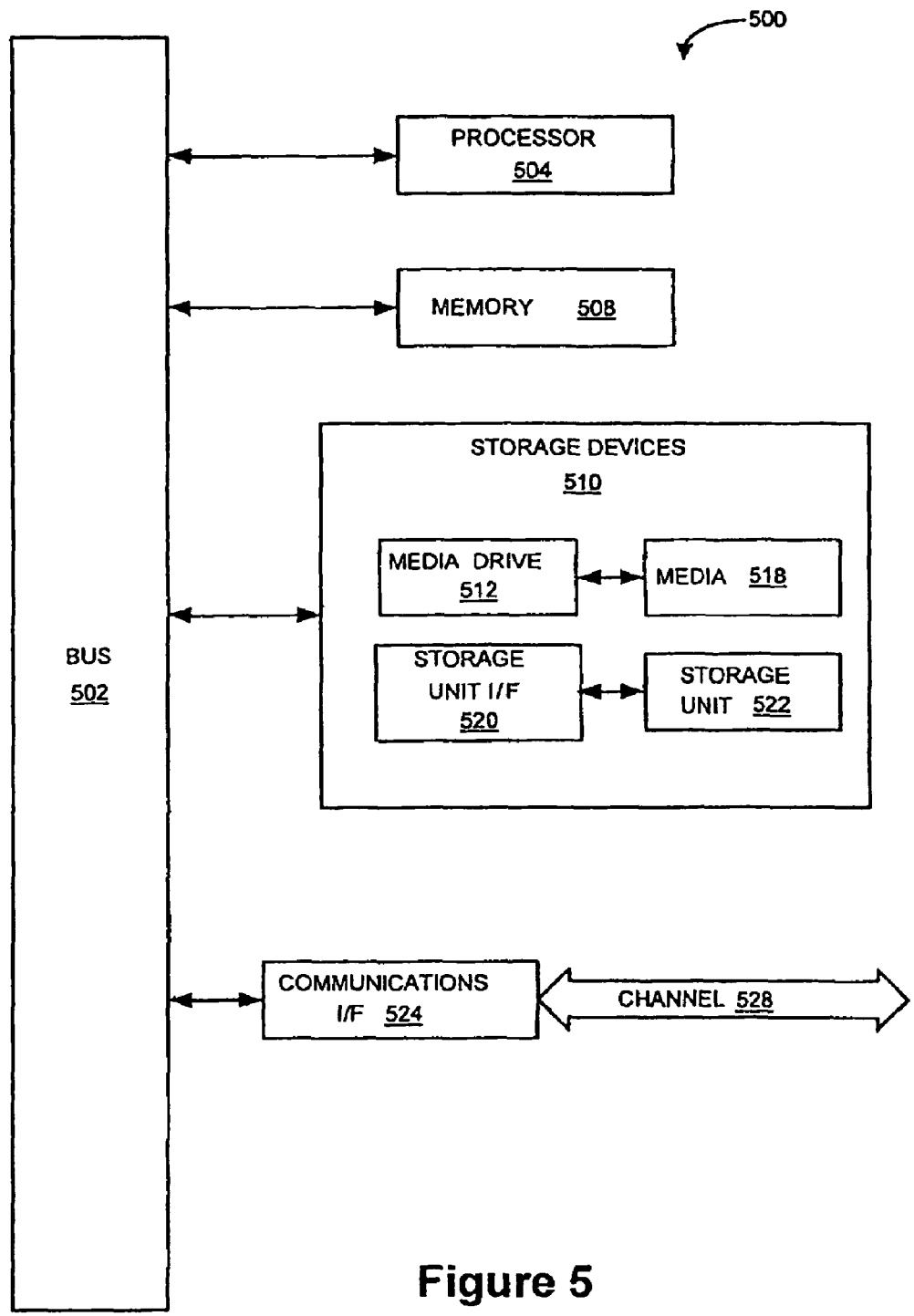
FIG. 5 illustrates an exemplary computing system that may be employed to implement processing functionality in embodiments provided herein.

FIG. 5 illustrates a typical computing system 500 that may be employed to implement processing functionality in embodiments of the invention. Computing systems of this type may be used in the any one or more of an MCU, controller, motherboard, daughterboard, or DSP, for example. Those skilled in the relevant art will also recognize how to implement embodiments of the invention using other computer systems or architectures. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory (ROM) or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a compact disk (CD) or digital versatile disk (DVD) drive (R or RW), or other removable or fixed media drive. Storage media 518, may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other network interface card (NIC)), a communications port (such as for example, a USB port), a PCMCIA slot and card, etc. Software and data transferred via communications interface 524 are in the form of signals which can be electronic, electromagnetic, optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 508, storage device 518, or storage unit 522. These and other forms of computer-readable media may store one or more instructions for use by processor 504, to cause the processor to perform specified operations. Such instructions, generally referred to as "computer program code" (which may be grouped in the form of computer programs or other groupings), when executed, enable the computing system 500 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of embodiments of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although embodiments of the invention have been described in connection with some embodiments, it is not intended to be limited to the specific form set forth herein. Rather, the scope of embodiments of the invention is limited only by the claims. Additionally, although a feature may appear to be described in connection with particular embodiments, one skilled in the art would recognize that various features of the described embodiments may be combined in accordance with embodiments of the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A video processing system for a multipoint control unit, comprising:
   a plurality of signal processors that perform processing of data representative of video images, the plurality of signal processors being interconnected via switches that choose between unicast and multicast transmission of received data; and
   each of the switches maintains a representation of a network topology of an entire architecture of the multipoint control unit of links between the signal processors allowing the switches to make routing decisions and determines an unicast or multicast format transmission of data for a next hop or hops.

2. A method of routing video data in a multipoint control unit having a plurality of signal processors, the plurality of signal processors being interconnected via switches that choose between unicast and multicast transmission of received data, the method comprising:
   storing or retrieving, in each of the switches, a representation of a network topology of an entire architecture of the multipoint control unit of links between the signal processors allowing the switches to make routing decisions; and
   selectively switching one or more of a plurality of switches to switch data between the signal processors in the unicast or multicast format dependent on the network topology.

3. The method of claim 2, further comprising transmitting information in the unicast format until a routing branch is reached at which data needs to follow a plurality of links and then transmitting information in the multicast format at that routing branch.

4. A non-transitory computer readable medium encoded with computer program instructions for routing video data in a multipoint control unit having a plurality of signal processors, the plurality of signal processors being interconnected via switches that choose between unicast and multicast transmission of received data, the computer program instructions comprising:
   instructions for storing, in each of the switches, a representation of a network topology of an entire architecture of the multipoint control unit of links between the signal processors allowing the switches to make routing decisions; and
   instructions for selectively switching one or more of a plurality of switches to switch data between the signal processors in the unicast or multicast format dependent on the network topology.

* * * * *